US012217674B2

(12) United States Patent
Liu

(10) Patent No.: US 12,217,674 B2
(45) Date of Patent: Feb. 4, 2025

(54) PIXEL DRIVING CIRCUIT, PIXEL DRIVING METHOD, AND DISPLAY PANEL FOR IMPROVING DISPLAY UNIFORMITY THROUGH 7T2C PIXEL DRIVING CIRCUIT

(71) Applicant: TCL China Star Optoelectronics Technology Co., Ltd., Guangdong (CN)

(72) Inventor: Bin Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/790,203

(22) PCT Filed: Jun. 7, 2022

(86) PCT No.: PCT/CN2022/097381
§ 371 (c)(1),
(2) Date: Jun. 30, 2022

(87) PCT Pub. No.: WO2023/226083
PCT Pub. Date: Nov. 30, 2023

(65) Prior Publication Data

US 2024/0185778 A1 Jun. 6, 2024

(30) Foreign Application Priority Data

May 27, 2022 (CN) ......................... 202210592364.8

(51) Int. Cl.
*G09G 3/3233* (2016.01)

(52) U.S. Cl.
CPC ... *G09G 3/3233* (2013.01); *G09G 2300/0852* (2013.01); *G09G 2320/0233* (2013.01); *G09G 2320/045* (2013.01)

(58) Field of Classification Search
CPC .................................................... G09G 3/3233
See application file for complete search history.

(56) References Cited

U.S. PATENT DOCUMENTS

2006/0256057 A1* 11/2006 Han ..................... G09G 3/3258 345/92
2019/0325818 A1* 10/2019 Wang .................. G09G 3/3225
(Continued)

FOREIGN PATENT DOCUMENTS

CN 101996579 3/2011
CN 103035201 4/2013
(Continued)

OTHER PUBLICATIONS

International Search Report and the Written Opinion Dated Nov. 28, 2022 From the International Searching Authority Re. Application No. PCT/CN2022/097381 and Its Translation Into English. (19 Pages).
(Continued)

*Primary Examiner* — Chun-Nan Lin

(57) ABSTRACT

Disclosed in embodiments of the present application are a pixel driving circuit, a pixel driving method, and a display panel, comprising a first thin film transistor, a second thin film transistor, a third thin film transistor, a fourth thin film transistor, a fifth thin film transistor, a sixth thin film transistor, a seventh thin film transistor, a first capacitor, a second capacitor, and a light-emitting device. The first thin film transistor is used as a driving thin film transistor of the light-emitting device. A threshold voltage of a driving thin film transistor in each pixel may be compensated.

18 Claims, 6 Drawing Sheets

(56) References Cited

U.S. PATENT DOCUMENTS

| | | | | |
|---|---|---|---|---|
| 2020/0273406 | A1* | 8/2020 | Xu | G09G 3/3233 |
| 2021/0241687 | A1* | 8/2021 | Xie | G09G 3/3233 |
| 2021/0335231 | A1* | 10/2021 | Qing | G09G 3/3283 |
| 2022/0293707 | A1* | 9/2022 | Zhou | H10K 59/131 |
| 2022/0320455 | A1* | 10/2022 | Qiu | C07D 307/91 |
| 2022/0392964 | A1* | 12/2022 | Wu | G09G 3/3233 |
| 2023/0215341 | A1* | 7/2023 | Liu | G09G 3/32 345/212 |
| 2023/0368736 | A1* | 11/2023 | No | G09G 3/3233 |

FOREIGN PATENT DOCUMENTS

| | | | |
|---|---|---|---|
| CN | 203311818 | 11/2013 | |
| CN | 103943070 | 7/2014 | |
| CN | 104143313 | 11/2014 | |
| CN | 104318902 | 1/2015 | |
| CN | 111048044 | 4/2020 | |
| CN | 112071275 | 12/2020 | |
| CN | 112767881 | 5/2021 | |
| CN | 113241036 | 8/2021 | |
| CN | 113571009 | * 10/2021 | G09G 3/32 |
| CN | 114023254 | 2/2022 | |
| CN | 114038413 | 2/2022 | |
| CN | 114093321 | 2/2022 | |
| JP | 2005-195756 | 7/2005 | |
| KR | 10-2009-0046053 | 5/2009 | |
| KR | 10-2010-0054895 | 5/2010 | |

OTHER PUBLICATIONS

Notification of Office Action and Search Report Dated Dec. 28, 2022 From the State Intellectual Property Office of the People's Republic of China Re. Application No. 202210592364.8 and Its Translation Into English. (29 Pages).

* cited by examiner

PIXEL DRIVING CIRCUIT, PIXEL DRIVING METHOD, AND DISPLAY PANEL FOR IMPROVING DISPLAY UNIFORMITY THROUGH 7T2C PIXEL DRIVING CIRCUIT

RELATED APPLICATIONS

This application is a National Phase of PCT Patent Application No. PCT/CN2022/097381 having International filing date of Jun. 7, 2022, which claims the benefit of priority of Chinese Patent Application No. 202210592364.8 filed on May 27, 2022. The contents of the above applications are all incorporated by reference as if fully set forth herein in their entirety.

FIELD AND BACKGROUND OF THE INVENTION

The present application relates to a display technology, and more specifically, to a pixel driving circuit, a pixel driving method, and a display panel.

In recent years, mini light-emitting diodes (mini-LEDs), micro light-emitting diodes (micro-LEDs), and organic light-emitting diodes (OLEDs), due to characteristics like high color gamut and high contrast, have gradually become research objects of people.

With an increase in a panel size, a traditional passive matrix (PM) driving mode requires a very large transient current and has a high requirement for power supply and power consumption. An active matrix (AM) driving mode lights light-emitting diodes (LEDs) by scanning line by line through a thin film transistor (TFT) switch and a capacitor, which may effectively prevent a problem of the large transient current.

SUMMARY OF THE INVENTION

Technical Problem

However, in the AM driving mode, due to a long-time operation, a threshold voltage offset would occur to a driving thin film transistor, which causes current decay of a light-emitting device.

Technical Solution

Embodiments of the present application provide a pixel driving circuit, a pixel driving method, and a display panel, so as to solve a problem that in the AM driving mode, due to the long-time operation, the threshold voltage offset would occur to the driving thin film transistor, which causes the current decay of the light-emitting device.

In a first aspect, an embodiment of the present application provides a pixel driving circuit, comprising a first thin film transistor, a second thin film transistor, a third thin film transistor, a fourth thin film transistor, a fifth thin film transistor, a sixth thin film transistor, a seventh thin film transistor, a first capacitor, a second capacitor, and a light-emitting device, the first thin film transistor configured as a driving thin film transistor of the light-emitting device, wherein

- a gate of the first thin film transistor is electrically connected to a first node, and a drain of the first thin film transistor is electrically connected to a second node;
- a gate of the second thin film transistor receives a first scan signal, a source of the second thin film transistor receives a data signal, and a drain of the second thin film transistor is electrically connected to the first node;
- a gate of the third thin film transistor receives a light-emitting controlling signal, and a drain of the third thin film transistor is electrically connected to a source of the first thin film transistor;
- a gate of the fourth thin film transistor receives the light-emitting controlling signal, a source of the fourth thin film transistor is electrically connected to the second node, and a drain of the fourth thin film transistor receives a common ground voltage;
- a gate of the fifth thin film transistor receives a second scan signal, a source of the fifth thin film transistor is connected to the first node, and a drain of the fifth thin film transistor is electrically connected to the drain of the third thin film transistor;
- a gate of the sixth thin film transistor receives a third scan signal, a source of the sixth thin film transistor receives a power voltage, and a drain of the sixth thin film transistor is electrically connected to the first node;
- a gate of the seventh thin film transistor receives a fourth scan signal, a source of the seventh thin film transistor receives a reference signal, and a drain of the seventh thin film transistor is electrically connected to the second node;
- one end of the first capacitor is electrically connected to the first node, and another end of the first capacitor is electrically connected to the second node;
- one end of the second capacitor is electrically connected to the first node, and another end of the second capacitor is electrically connected to the drain of the second thin film transistor; and
- an anode of the light-emitting device receives the power voltage, and a cathode of the light-emitting device is electrically connected to a source of the third thin film transistor.

In a second aspect, an embodiment of the present application further provides a pixel driving method applied to a pixel driving circuit. The pixel driving circuit comprising: a first thin film transistor, wherein a gate of the first thin film transistor is electrically connected to a first node, and a drain of the first thin film transistor is electrically connected to a second node; a second thin film transistor, wherein a gate of the second thin film transistor receives a first scan signal, a source of the second thin film transistor receives a data signal, and a drain of the second thin film transistor is electrically connected to the first node; a third thin film transistor, wherein a gate of the third thin film transistor receives a light-emitting controlling signal, and a drain of the third thin film transistor is electrically connected to a source of the first thin film transistor; a fourth thin film transistor, wherein a gate of the fourth thin film transistor receives the light-emitting controlling signal, a source of the fourth thin film transistor is electrically connected to the second node, and a drain of the fourth thin film transistor receives a common ground voltage; a fifth thin film transistor, wherein a gate of the fifth thin film transistor receives a second scan signal, a source of the fifth thin film transistor is connected to the first node, and a drain of the fifth thin film transistor is electrically connected to the drain of the third thin film transistor; a sixth thin film transistor, wherein a gate of the sixth thin film transistor receives a third scan signal, a source of the sixth thin film transistor receives a power voltage, and a drain of the sixth thin film transistor is electrically connected to the first node; a seventh thin film transistor, wherein a gate of the seventh thin film transistor receives a fourth scan signal, a source of the seventh thin film transistor receives a reference signal, and a drain of the seventh thin film transistor is electrically connected to the second node; a first capacitor, one end of the first capacitor being connected to the first node, and another end of the first capacitor being connected to the second node; a second capacitor, one end of the second capacitor being connected to the first node, and another end of the second capacitor being connected to the drain of the second thin film transistor; and a light-emitting device, wherein an anode of the light-emitting device receives the power voltage, and a cathode of the light-emitting device is connected to a source of the third thin film transistor; and the light-emitting device is driven by the first thin film transistor.

The pixel driving method comprises:

during an initialization stage, controlling all of the first scan signal, the third scan signal, and the fourth scan signal to be at a high voltage level, and controlling all of the second scan signal, the light-emitting controlling signal, and the data signal to be at a low voltage level, so that a voltage level of the first node is the power voltage, and a voltage level of the second node is the reference signal;

during a threshold voltage extraction stage, controlling all of the first scan signal, the second scan signal, and the fourth scan signal to be at the high voltage level, and controlling all of the third scan signal, the light-emitting controlling signal, and the data signal to be at the low voltage level, so that the voltage level of the first node is a sum of the reference signal and a threshold voltage, and the voltage level of the second node is the reference signal;

during a data writing stage, controlling all of the first scan signal, the fourth scan signal, and the data signal to be at the high voltage level, and controlling all of the second scan signal, the third scan signal, and the light-emitting controlling signal to be at the low voltage level, so that the voltage level of the first node is a sum of a difference value between the high voltage level and the low voltage level of the data signal, and the reference signal, and the threshold voltage, and the voltage level of the second node is the reference signal.

during a light-emitting stage, controlling the light-emitting controlling signal to be at the high voltage level, and controlling all of the first scan signal, the second scan signal, the third scan signal, the fourth scan signal, and the data signal to be at the low voltage level, so that the voltage level of the second node is the ground voltage, and the voltage level of the first node is a sum of the difference value between the high voltage level and the low voltage level of the data signal, and the threshold voltage, and the ground voltage.

In a third aspect, an embodiment of the present application further provides a display panel, which comprises the pixel driving circuit as described in any of the above items.

A pixel driving circuit, a pixel driving method, and a display panel of the embodiments of the present application adopt a 7T2C pixel driving circuit, which controls a scan signal, a light-emitting signal, and a data signal respectively in an initialization stage, a threshold voltage extraction stage, a data writing stage, and a light-emitting stage to be at different voltage levels, so as to compensate for a threshold voltage of a driving thin film transistor in each pixel, and further eliminate an influence of the threshold voltage of the driving thin film transistor on a current flowing through a light-emitting device, thereby improving display uniformity of the display panel. In addition, during the light-emitting stage, an influence of a voltage drop of a part of communication signal lines on the display panel can at least be eliminated.

BRIEF DESCRIPTION OF THE SEVERAL VIEWS OF THE DRAWINGS

In order to describe technical solutions in the embodiments of the present application more clearly, accompanying drawings required for the description of the embodiments are briefly introduced. Obviously, the accompanying drawings in the following description are merely some embodiments of the present application. Those skilled in the art can obtain other drawings according to these drawings without creative effort.

For a more complete understanding of the present application and the beneficial effect thereof, the following description will be made with reference to the accompanying drawings. In the following description, the same reference numbers refer to the same parts.

DESCRIPTION OF SPECIFIC EMBODIMENTS OF THE INVENTION

A clear and complete description of technical solutions in embodiments of the present application will be provided in conjunction with the accompanying drawings in the embodiments of the present application. Obviously, the embodiments are merely application part of the embodiments of the present application, but not all of the embodiments. All other embodiments obtained by those skilled in the art without creative effort based on the embodiments in the present application are within the scope of protection of the present application.

In order to solve a problem that in an AM driving mode, due to long-time operation, a threshold voltage offset would occur to a driving thin film transistor, which causes a current decay of a light-emitting device, the embodiments of the present application provide a pixel driving circuit, a pixel driving method, and a display panel, which will be described below with reference to the accompanying drawings.

Figure 1:
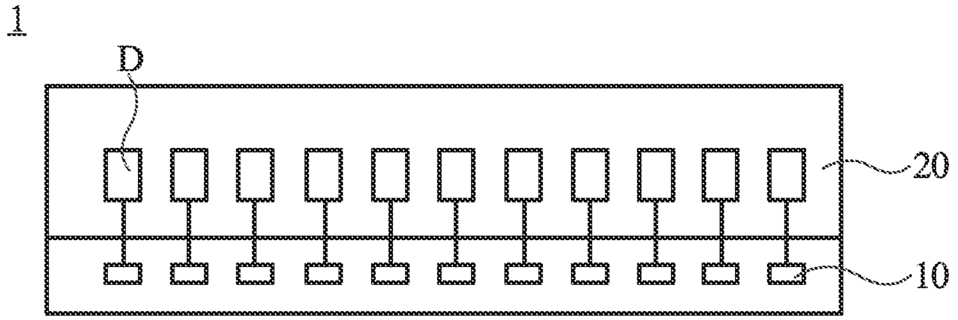
FIG. 1 is a structural schematic diagram of a side view of a display panel provided by an embodiment of the present application.

Exemplarily, please refer to FIG. 1, FIG. 1 is a structural schematic diagram of a side view of a display panel provided by an embodiment of the present application. The embodiment of the present application provides a display panel 1. The display panel 1 may include a pixel layer 20, a light-emitting layer, a driving circuit layer, and an array substrate which are stacked in sequence. The driving circuit is disposed on the array substrate. The pixel layer 20 may include a plurality of pixels arranged in an array. The light-emitting layer is provided with a light-emitting device D corresponding to each pixel. The driving circuit layer may include a plurality of pixel driving circuits 10. Each pixel is provided with a pixel driving circuit 10. The pixel driving circuit 10 is used to drive light emission of the light-emitting device D of the corresponding pixel. The light-emitting device D may be an organic light-emitting diode. The organic light-emitting diode is also called an organic electro-laser display or an organic light-emitting semiconductor, which refers to a phenomenon that under driving of an electric field, an organic semiconductor material and a light-emitting material emit light through carrier injection and recombination. The light-emitting device D may also be a mini light-emitting diode. The light-emitting device D can also be a micro light-emitting diode. The embodiments of the present application take the organic light-emitting diode as the light-emitting device D as an example for illustration.

With an increase of a size of the display panel 1, a traditional passive matrix driving mode requires a very large transient current and has a high requirement for power supply and power consumption. An active matrix driving mode lights light-emitting diodes (LEDs) by scanning line by line through a thin film transistor and a capacitor, which may effectively prevent a problem of the large transient current. However, in the prior art, the pixel driving circuit is generally a 2T1C structure, that is, a structure having two thin film transistors and one capacitor. A current flowing through a driving thin film transistor and the light-emitting device D is calculated according to an equation: I_D=K×(Vgs−Vth). D represents the current flowing through the driving thin film transistor and the light-emitting device D; K is an intrinsic conductance factor of the driving thin film transistor; Vgs represents a voltage difference between a gate and a source of the driving thin film transistor; and Vth represents a threshold voltage of the driving thin film transistor. It can be seen that a magnitude of I_D correlates with the threshold voltage Vth of the driving thin film transistor. Due to a long-time operation, a threshold voltage offset would occur to the driving thin film transistor driving the light-emitting device D to emit light, which causes a current decay of the light-emitting device. In addition, a voltage drop of a signal line in the display panel may also cause a current difference between light-emitting devices of the display panel, and macroscopically visible moire patterns (also referred to as unevenness) are generated.

To solve the above-mentioned problem, the embodiment of the present application improves the pixel driving circuit 10. The pixel driving circuit 10 will be described hereinafter in combination with the accompanying drawings.

Figure 2:
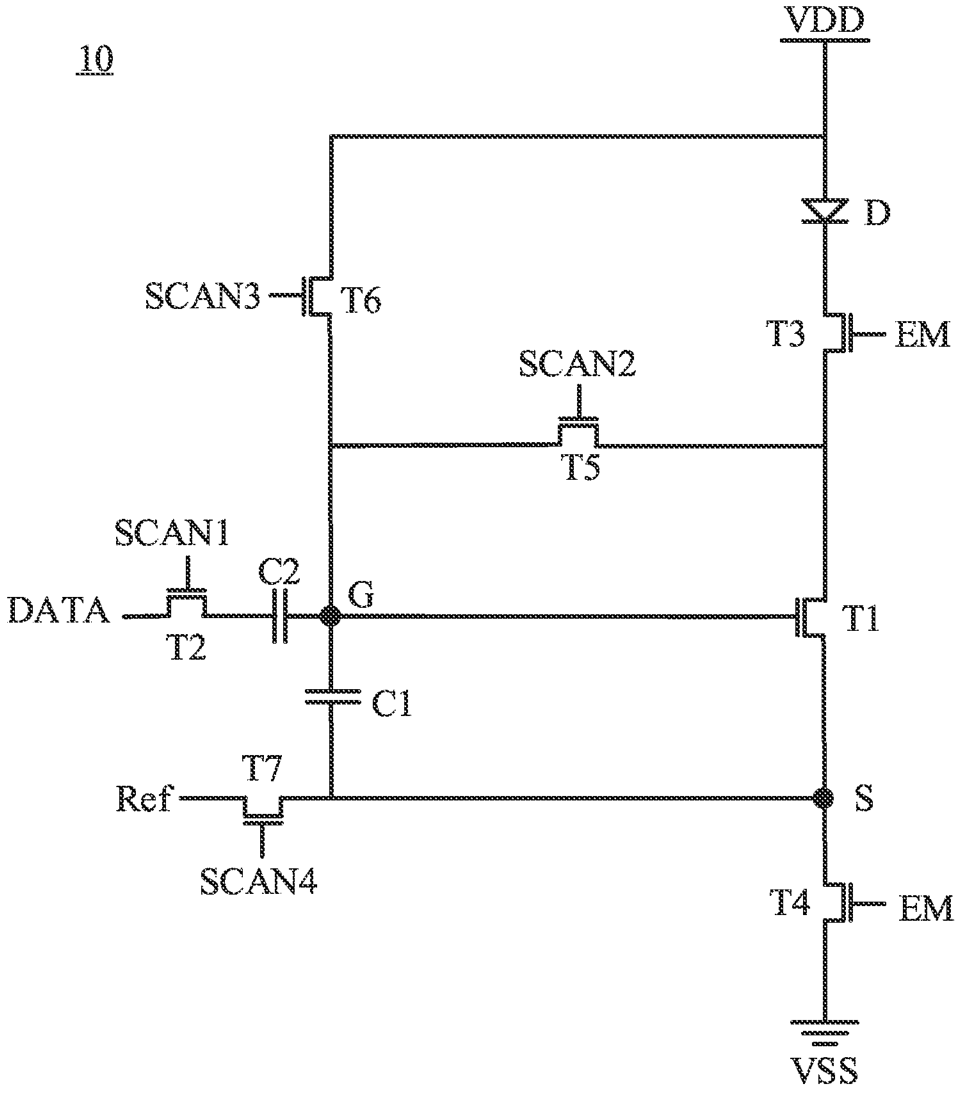
FIG. 2 is a structural schematic diagram of a pixel driving circuit in the display panel as shown in FIG. 1.

Exemplarily, please refer to FIG. 2 in combination with FIG. 1, FIG. 2 is a structural schematic diagram of the pixel driving circuit in the display panel as shown in FIG. 1. The pixel driving circuit 10 in an embodiment of the present application includes a first thin film transistor T1, a second thin film transistor T2, a third thin film transistor T3, a fourth thin film transistor T4, a fifth thin film transistor T5, a sixth thin film transistor T6, a seventh thin film transistor T7, a first capacitor C1, a second capacitor C2, and a light-emitting device D. The first thin film transistor T1 can be configured as a driving thin film transistor of the light-emitting device D. The second thin film transistor T2 is a data writing thin film transistor. The third thin film transistor T3 and the fourth thin film transistor T4 may be used to emit light. The fifth thin film transistor T5 and the sixth thin film transistor T6 may be used in a detection stage of a threshold voltage Vth of the first thin film transistor T1. The seventh thin film transistor T7 may be used to empty electric charge of a second node S. The first capacitor C1 may be a storage capacitor. The second capacitor C2 may be used to write in a data voltage. All of the first thin film transistor T1, the second thin film transistor T2, the third thin film transistor T3, the fourth thin film transistor T4, the fifth thin film transistor T5, the sixth thin film transistor T6, and the seventh thin film transistor T7 are oxide semiconductor thin film transistors, low-temperature polysilicon thin film transistors, or amorphous silicon thin film transistors. That is, types of all of the thin film transistors T1 to T7 may be indium gallium zinc oxide (IGZO), low-temperature polysilicon (LTPS), or amorphous silicon (A-Si) types. Of course, the thin film transistors T1 to T7 may adopt different types of thin film transistors, and there are a plurality of combination methods, which will not be described here. For example, the thin film transistor of the LTPS type may be divided into two structures: an N type and a P type, wherein the N-type TFT may use lightly doped drain (LDD) to reduce a leakage current of a component. Hence, all of the first thin film transistor T1, the second thin film transistor T2, the third thin film transistor T3, the fourth thin film transistor T4, the fifth thin film transistor T5, the sixth thin film transistor T6, and the seventh thin film transistor T7 may be N-type TFTs.

A gate of the first thin film transistor T1 is electrically connected to a first node G, and a drain of the first thin film transistor T1 is electrically connected to the second node S.

A gate of the second thin film transistor T2 receives a first scan signal SCAN1, a source of the second thin film transistor T2 receives a data signal DATA, and a drain of the second thin film transistor T2 is electrically connected to the first node G.

A gate of the third thin film transistor T3 receives a light-emitting controlling signal EM, and a drain of the third thin film transistor T3 is electrically connected to a source of the first thin film transistor T1.

A gate of the fourth thin film transistor T4 receives the light-emitting controlling signal EM, a source of the fourth thin film transistor T4 is electrically connected to the second node S, and a drain of the fourth thin film transistor T4 receives a common ground voltage VSS.

A gate of the fifth thin film transistor T5 receives a second scan signal SCAN2, a source of the fifth thin film transistor T5 is connected to the first node G, and a drain of the fifth thin film transistor T5 is electrically connected to the drain of the third thin film transistor T3.

A gate of the sixth thin film transistor T6 receives a third scan signal SCAN3, a source of the sixth thin film transistor T6 receives a power voltage VDD, and a drain of the sixth thin film transistor T6 is electrically connected to the first node G.

A gate of the seventh thin film transistor T7 receives a fourth scan signal SCAN4, a source of the seventh thin film transistor T7 receives a reference signal Ref, and a drain of the seventh thin film transistor T7 is electrically connected to the second node S.

One end of the first capacitor C1 is electrically connected to the first node G, and another end of the first capacitor C1 is electrically connected to the second node S.

One end of the second capacitor C2 is electrically connected to the first node G, and another end of the second capacitor C2 is electrically connected to the drain of the second thin film transistor T2. The second capacitor C2 is directly connected to the data signal DATA. When the data signal DATA is at a high voltage level, the data signal is written through a coupling method, which will not affect data storage of a threshold voltage. For example, stored threshold voltage information may be prevented from being lost.

An anode of the light-emitting device D receives the power voltage VDD, and a cathode of the light-emitting device D is electrically connected to a source of the third thin film transistor T3. The light-emitting device D is disposed at the power voltage VDD. Through dividing voltage by the light-emitting device D, a voltage value of the scan signal(s) may be reduced, thereby reducing power consumption of the pixel driving circuit 10.

The present application adopts the 7T2C pixel driving circuit 10, which controls a scan signal, a light-emitting signal, and a data signal respectively in an initialization stage, a threshold voltage extraction stage, a data writing stage, and a light-emitting stage to be at different voltage levels, so as to compensate for a threshold voltage of a driving thin film transistor in each pixel and further eliminate an influence of the threshold voltage of the driving thin film transistor on a current flowing through the light-emitting device D, thereby improving display uniformity of the display panel 1. In addition, during the light-emitting stage, an influence of a voltage drop of a part of communication signal lines on the display panel 1 can further be eliminated at least.

Figure 3:
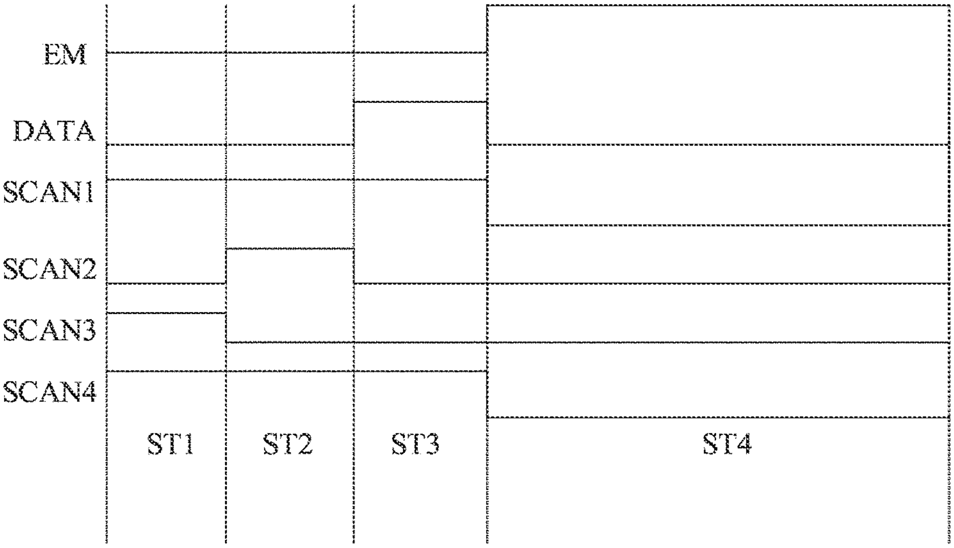
FIG. 3 is a timing diagram of the pixel driving circuit provided by an embodiment of the present application.

Exemplarily, please refer to FIG. 3 in combination with FIG. 1 and FIG. 2, FIG. 3 is a timing diagram of the pixel driving circuit provided by an embodiment of the present application. The first scan signal SCAN1, the second scan signal SCAN2, the third scan signal SCAN3, the fourth scan signal SCAN4, the light-emitting controlling signal EM, and the data signal DATA are combined to correspond to the initialization stage ST1, the threshold voltage extraction stage ST2, the data writing stage ST3, and the light-emitting stage ST4 in sequence.

Figure 4:
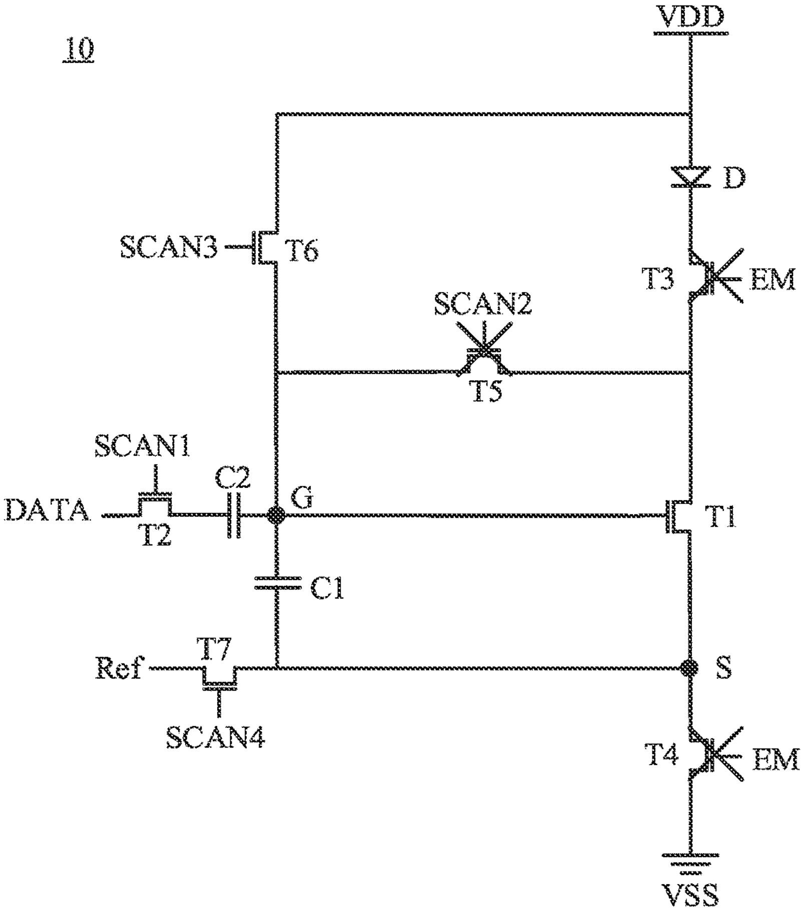
FIG. 4 is a circuit diagram of the pixel driving circuit provided by an embodiment of the present application in an initialization stage of a driving timing as shown in FIG. 3.

Please refer to FIG. 4 in combination with FIG. 1 to FIG. 3, FIG. 4 is a circuit diagram of the pixel driving circuit provided by an embodiment of the present application in the initialization stage of a driving timing as shown in FIG. 3. During the initialization stage ST1, all of the first scan signal SCAN1, the third scan signal SCAN3, and the fourth scan signal SCAN4 are at a high voltage level, and all of the second scan signal SCAN2, the light-emitting controlling signal EM, and the data signal DATA are at a low voltage level. A voltage level of the first node G is the power voltage VDD, and a voltage level of the second node S is the reference signal Ref. It should be understood that, during this stage, the first scan signal SCAN1, the third scan signal SCAN3, and the fourth scan signal SCAN4 at the high voltage level turn on the second thin film transistor T2, the sixth thin film transistor T6, and the seventh thin film transistor T7, respectively. All of the second scan signal SCAN2, the light-emitting controlling signal EM, and the data signal DATA are at the low voltage level, that is, all of the fifth thin film transistor T5, the third thin film transistor T3, and the fourth thin film transistor T4 are turned off.

Figure 5:
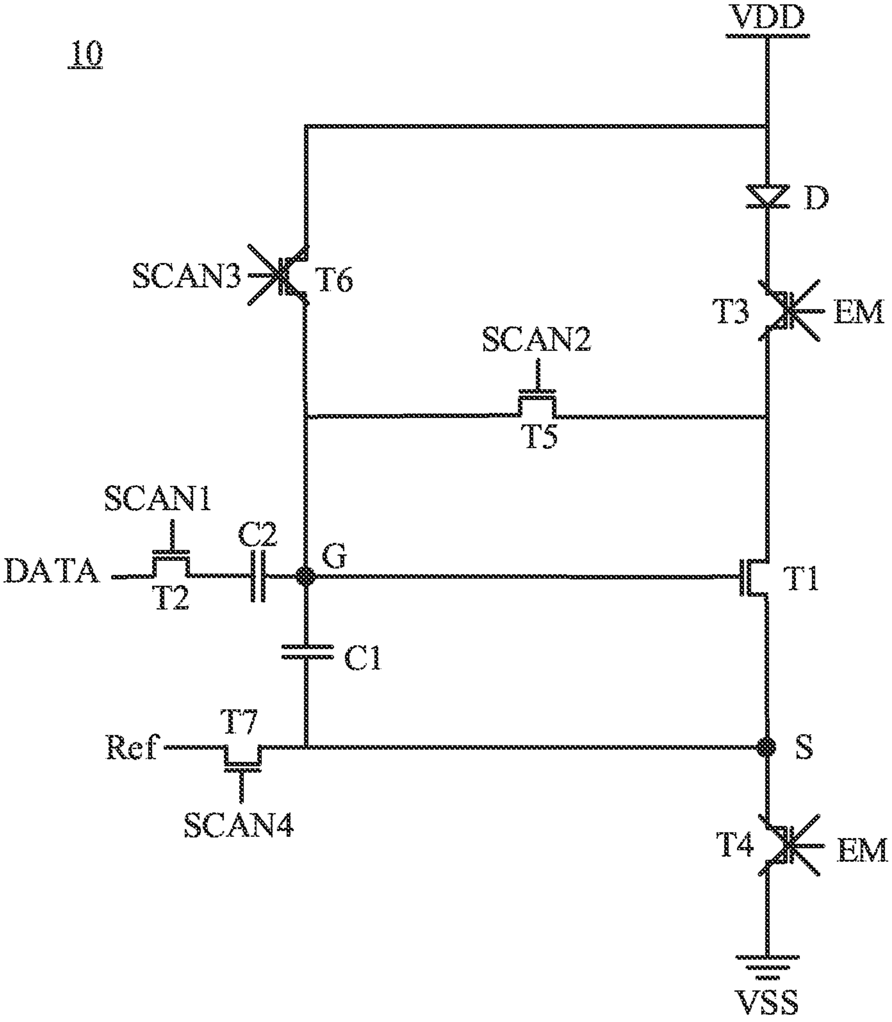
FIG. 5 is a circuit diagram of the pixel driving circuit provided by an embodiment of the present application in a threshold voltage extraction stage of the driving timing as shown in FIG. 3.

Please refer to FIG. 5 in combination with FIG. 1 to FIG. 3, FIG. 5 is a circuit diagram of the pixel driving circuit provided by an embodiment of the present application in the threshold voltage extraction stage of the driving timing as shown in FIG. 3. During the threshold voltage extraction stage ST2, all of the first scan signal SCAN1, the second scan signal SCAN2, and the fourth scan signal SCAN4 are at the high voltage level, and all of the third scan signal SCAN3, the light-emitting controlling signal EM, and the data signal DATA are at the low voltage level. The voltage level of the first node G is a sum of the reference signal Ref and a threshold voltage Vth, that is, the voltage level of the first node G is Ref+Vth. The voltage level of the second node S is the reference signal Ref. It should be understood that, during the stage ST2, the third scan signal SCAN3 at the low voltage level turns off the sixth thin film transistor T6, and the first scan signal SCAN1, the second scan signal SCAN2, and the fourth scan signal SCAN4 at the high voltage level turn on the second thin film transistor T2, the fifth thin film transistor T5, and the seventh thin film transistor T7, thereby forming a diode structure. The light-emitting controlling signal EM and the data signal DATA are both at the low voltage level, that is, the third thin film transistor T3 and the fourth thin film transistor T4 are both turned off. The voltage level of the first node G changes from the power voltage VDD to the sum Ref+Vth of the reference signal Ref and the threshold voltage Vth. The voltage level of the second node S is still the reference signal Ref.

Figure 6:
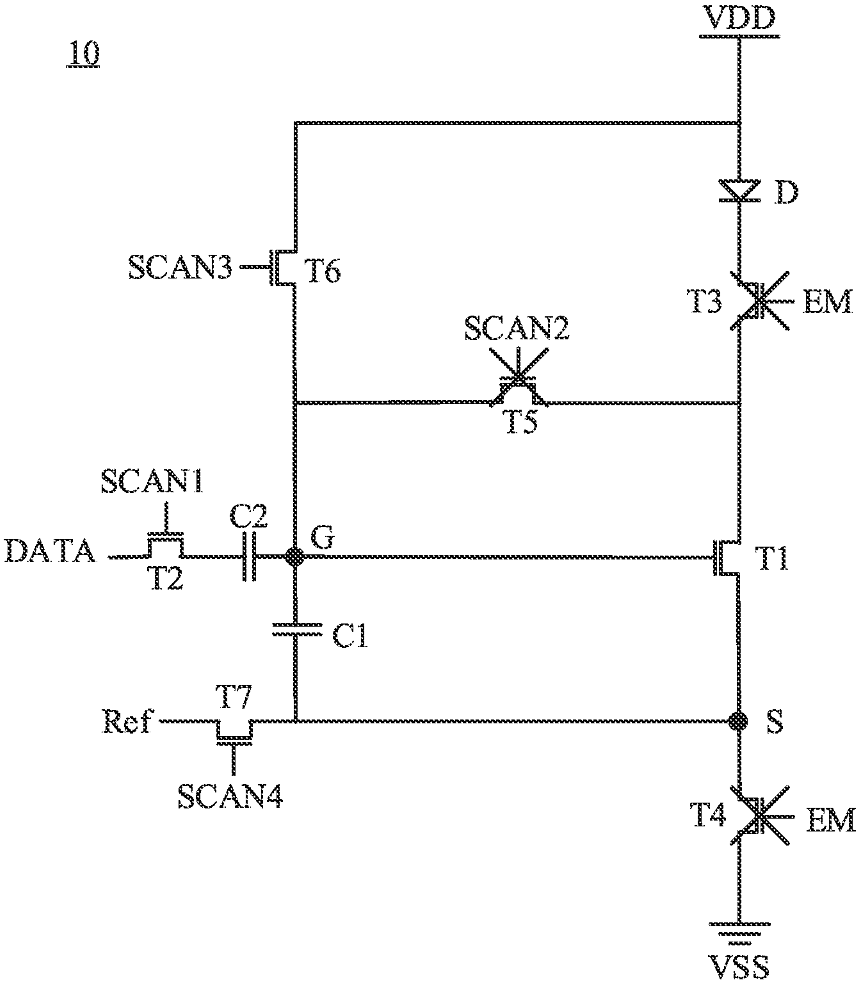
FIG. 6 is a circuit diagram of the pixel driving circuit provided by an embodiment of the present application in a data writing stage of the driving timing as shown in FIG. 3.

Please refer to FIG. 6 in combination with FIG. 1 to FIG. 3, FIG. 6 is a circuit diagram of the pixel driving circuit provided by an embodiment of the present application in the data writing stage of the driving timing as shown in FIG. 3. During the data writing stage ST3, all of the second scan signal SCAN2, the third scan signal SCAN3, and the light-emitting controlling signal EM are at the low voltage level, the first scan signal SCAN1 and the fourth scan signal SCAN4 are at the high voltage level, and the data signal DATA is at the high voltage level. The voltage level of the first node G is a sum DATA_H-DATA_L+Ref+Vth of a difference value between a high voltage level DATA_H and a low voltage level DATA_L of the data signal, and the reference signal Ref and the threshold voltage Vth. The voltage level of the second node S is the reference signal Ref. It should be understood that, during the data writing stage ST3, the second scan signal SCAN2 changes from the high voltage level to the low voltage level, and the fifth thin film transistor T5 is turned off. The first scan signal SCAN1 and the fourth scan signal SCAN4 are at the high voltage level, and the second thin film transistor T2 and the seventh thin film transistor T7 are turned on. The data signal DATA changes from the low voltage level DATA_L to the high voltage level DATA_H, and the voltage level of the first node G changes to DATA_H-DATA_L+Ref+Vth. The voltage level of the second node S is still the reference signal Ref.

Figure 7:
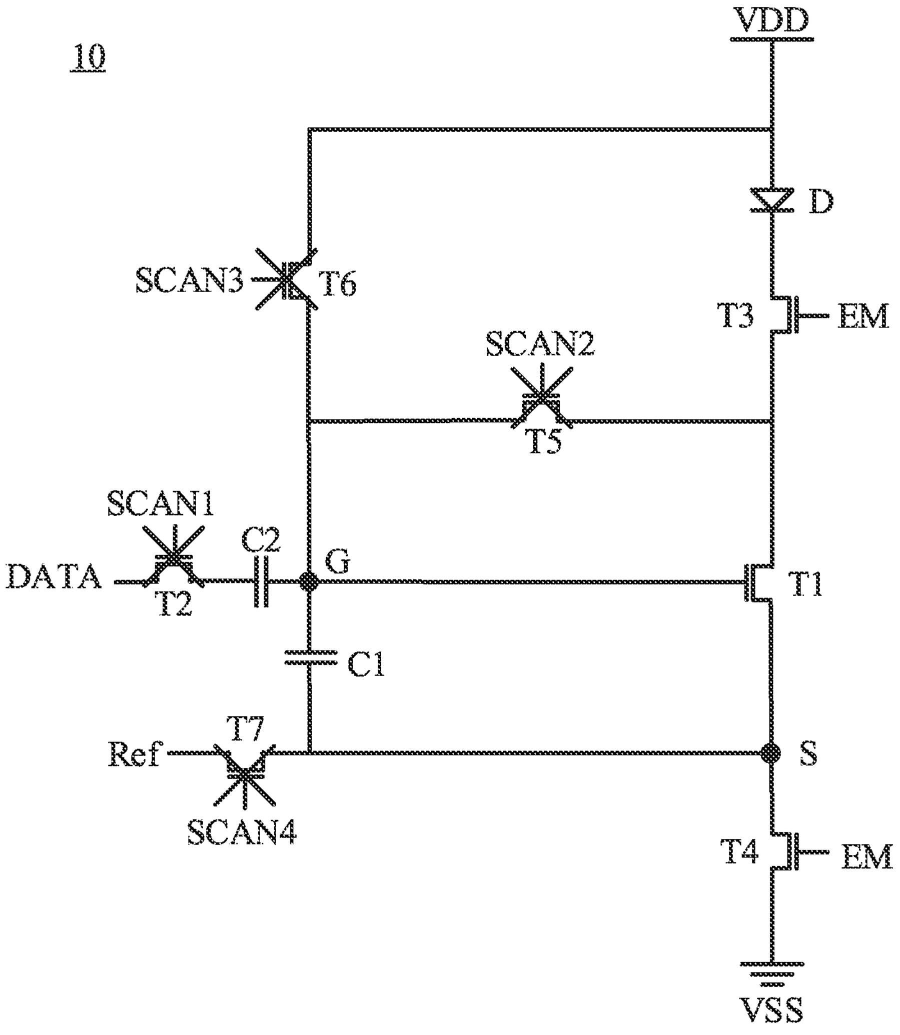
FIG. 7 is a circuit diagram of the pixel driving circuit provided by an embodiment of the present application in a light-emitting stage of the driving timing as shown in FIG. 3.

Please refer to FIG. 7 in combination with FIG. 1 to FIG. 3, FIG. 7 is a circuit diagram of the pixel driving circuit provided by an embodiment of the present application in the light-emitting stage of the driving timing as shown in FIG. 3. During the light-emitting stage ST4, the light-emitting controlling signal EM is at the high voltage level, and only the third thin film transistor T3 and the fourth thin film transistor T4 are turned on. All of the first scan signal SCAN1, the second scan signal SCAN2, the third scan signal SCAN3, the fourth scan signal SCAN4, and the data signal DATA are at the low voltage level. That is, all of the second thin film transistor T2, the fifth thin film transistor T5, the sixth thin film transistor T6, and the seventh thin film transistor T7 are turned off. The voltage level of the second node S is the ground voltage VSS. The voltage level of the first node G is a sum DATA_H-DATA_L+Vth+VSS of the difference value between the high voltage level DATA_H and the low voltage level DATA_L of the data signal, and the threshold voltage Vth and the ground voltage VSS. It should be understood that, during the light-emitting stage ST4, only the light-emitting controlling signal EM at the high voltage level turns on the third thin film transistor T3 and the fourth thin film transistor T4. All other thin film transistors are turned off. The voltage level of the second node S changes from the reference signal Ref to the ground voltage VSS. The voltage level of the first node G changes from DATA_H-DATA_L+Ref+Vth to DATA_H-DATA_L+Vth+VSS. Since Vgs−Vth=DATA_H-DATA_L, wherein Vgs represents a voltage difference between the gate and the source of the first thin film transistor T1, thus, during the light-emitting stage ST4, the voltage level of the first node G is Vgs+VSS. That is to say, during the light-emitting stage ST4, the current flowing through the light-emitting device D is independent from the threshold voltage Vth of the first thin film transistor T1, which realizes compensation for the threshold voltage Vth and further eliminates an influence of a threshold voltage offset of the first thin film transistor T1 on the current flowing through the light-emitting device D. In addition, a voltage level flowing through the first node G and the second node S changes to Vgs. That is, a current flowing through the first node G and the second node S is independent from the ground voltage VSS, which realizes compensation for the voltage drop and eliminates an influence of the voltage drop of the communication signal lines on the display panel 1, thereby improving display uniformity of the display panel 1.

It is to be noted that, in the embodiments of the present application, a detection method for the threshold voltage is a diode connect method, but it does not have rectification characteristics like a diode. The characteristics of the diode connect method is only a state of the diode that is forward conducting, which acts as small-signal characteristics like a small resistor. And in the prior art, the detection method for the threshold voltage is generally a source follow method.

It is to be noted that all of the first scan signal SCAN1, the second scan signal SCAN2, the third scan signal SCAN3, the fourth scan signal SCAN4, the light-emitting controlling signal EM, and the data signal DATA are generated by an external timing controller.

In order to more clearly describe an operation method of the pixel driving circuit 10 of the embodiments of the present application, the following description will be made from a perspective of a pixel driving method.

Figure 8:
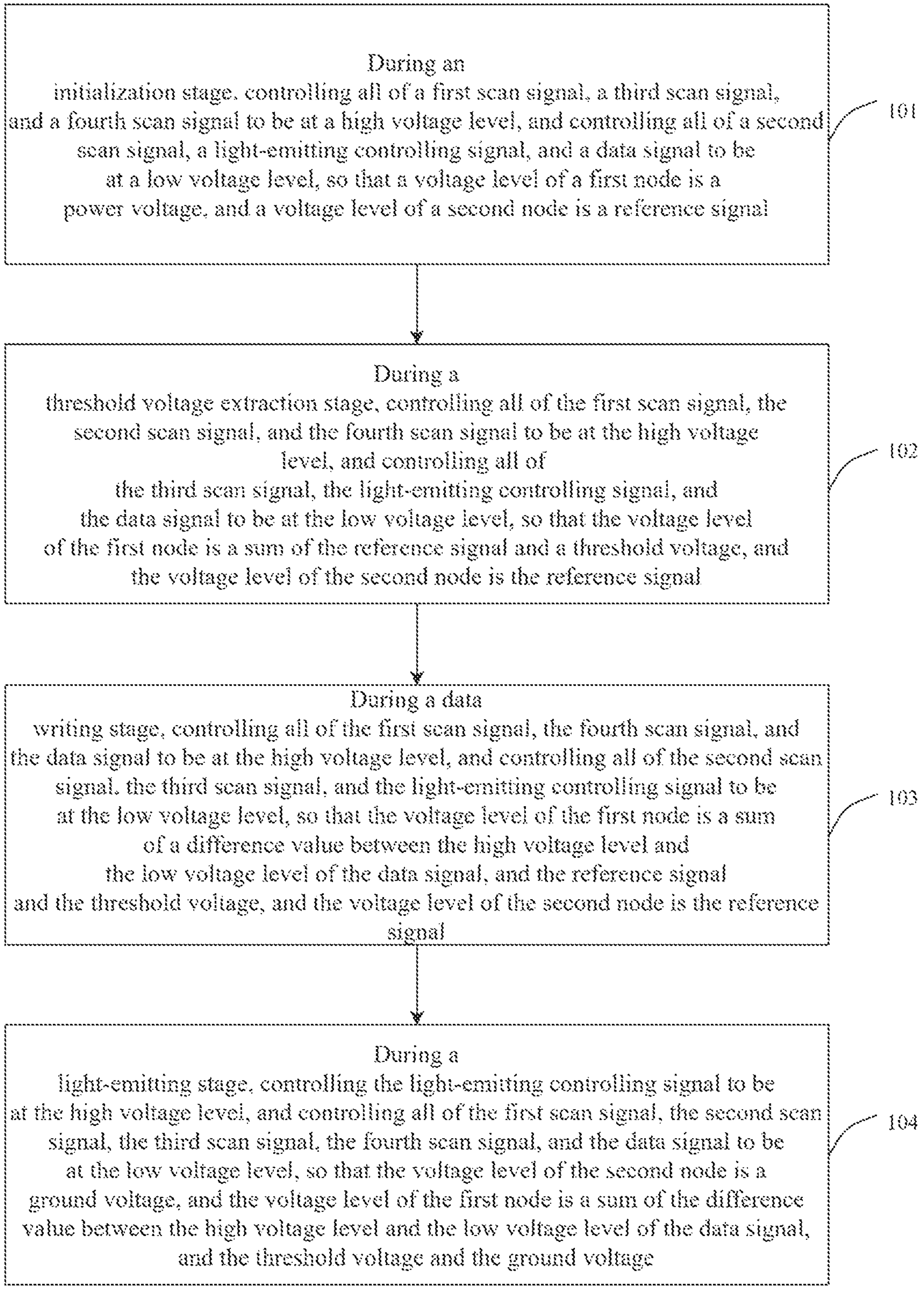
FIG. 8 is a schematic flowchart of a pixel driving method provided by an embodiment of the present application.

Please refer to FIG. 8 in combination with FIG. 1 to FIG. 7, FIG. 8 is a schematic flowchart of a pixel driving method provided by an embodiment of the present application. The pixel driving method is applied to a pixel driving circuit 10, and the pixel driving circuit 10 may refer to the above description, which will not be repeated here. The pixel driving method includes:

101, during an initialization stage, all of a first scan signal, a third scan signal, and a fourth scan signal are controlled to be at a high voltage level, and all of a second scan signal, a light-emitting controlling signal, and a data signal are controlled to be at a low voltage level, so that a voltage level of a first node is a power voltage, and a voltage level of a second node is a reference signal.

It is to be noted that, the first scan signal SCAN1, the second scan signal SCAN2, the third scan signal SCAN3, the fourth scan signal SCAN4, the light-emitting controlling signal EM, and the data signal DATA are combined to correspond to the initialization stage ST1, a threshold voltage extraction stage ST2, a data writing stage ST3, and a light-emitting stage ST4 in sequence.

During the initialization stage ST1, all of the first scan signal SCAN1, the third scan signal SCAN3, and the fourth scan signal SCAN4 are at the high voltage level, and all of the second scan signal SCAN2, the light-emitting controlling signal EM, and the data signal DATA are at the low voltage level. The voltage level of the first node G is the power voltage VDD. The voltage level of the second node S is the reference signal Ref. It should be understood that, during this stage, the first scan signal SCAN1, the third scan signal SCAN3, and the fourth scan signal SCAN4 at the high voltage level turn on a second thin film transistor T2, a sixth thin film transistor T6, and a seventh thin film transistor T7, respectively. All of the second scan signal SCAN2, the light-emitting controlling signal EM, and the data signal DATA are at the low voltage level, that is, all of a fifth thin film transistor T5, a third thin film transistor T3, and a fourth thin film transistor T4 are turned off.

102, during a threshold voltage extraction stage, all of the first scan signal, the second scan signal, and the fourth scan signal are controlled to be at the high voltage level, and all of the third scan signal, the light-emitting controlling signal, and the data signal are controlled to be at the low voltage level, so that the voltage level of the first node is a sum of the reference signal and a threshold voltage, and the voltage level of the second node is the reference signal.

During the threshold voltage extraction stage ST2, all of the first scan signal SCAN1, the second scan signal SCAN2, and the fourth scan signal SCAN4 are at the high voltage level, and all of the third scan signal SCAN3, the light-emitting controlling signal EM, and the data signal DATA are at the low voltage level. The voltage level of the first node G is a sum of the reference signal Ref and the threshold voltage Vth, that is, the voltage level of the first node G is Ref+Vth. The voltage level of the second node S is the reference signal Ref. It should be understood that, during the stage ST2, the third scan signal SCAN3 at the low voltage level turns off the sixth thin film transistor T6, and the first scan signal SCAN1, the second scan signal SCAN2, and the fourth scan signal SCAN4 at the high voltage level turn on the second thin film transistor T2, the fifth thin film transistor T5, and the seventh thin film transistor T7, thereby forming a diode structure. The light-emitting controlling signal EM and the data signal DATA are both at the low voltage level, that is, the third thin film transistor T3 and the fourth thin film transistor T4 are both turned off. The voltage level of the first node G changes from the power voltage VDD to the sum Ref+Vth of the reference signal Ref and the threshold voltage Vth. The voltage level of the second node S is still the reference signal Ref.

103, during a data writing stage, all of the first scan signal, the fourth scan signal, and the data signal are controlled to be at the high voltage level, and all of the second scan signal, the third scan signal, and the light-emitting controlling signal are controlled to be at the low voltage level, so that the voltage level of the first node is a sum of a difference value between a high voltage level and a low voltage level of the data signal, and the reference signal and the threshold voltage, and the voltage level of the second node is the reference signal.

During the data writing stage ST3, all of the second scan signal SCAN2, the third scan signal SCAN3, and the light-emitting controlling signal EM are at the low voltage level, the first scan signal SCAN1 and the fourth scan signal SCAN4 are at the high voltage level, and the data signal is at a high voltage level. The voltage level of the first node G is the sum DATA_H-DATA_L+Ref+Vth of the difference value between the high voltage level DATA_H and the low voltage level DATA_L of the data signal, and the reference signal Ref and the threshold voltage Vth. The voltage level of the second node S is still the reference signal Ref. It should be understood that, during the data writing stage ST3, the second scan signal SCAN2 changes from the high voltage level to the low voltage level, and the fifth thin film transistor T5 is turned off. The first scan signal SCAN1 and the fourth scan signal SCAN4 are at the high voltage level, and the second thin film transistor T2 and the seventh thin film transistor T7 are turned on. The data signal DATA changes from the low voltage level DATA_L to the high voltage level DATA_H, and the voltage level of the first node G changes to DATA_H-DATA_L+Ref+Vth. The voltage level of the second node S is still the reference signal Ref.

104, during a light-emitting stage, the light-emitting controlling signal is controlled to be at the high voltage level, and all of the first scan signal, the second scan signal, the third scan signal, the fourth scan signal, and the data signal are controlled to be at the low voltage level, so that the voltage level of the second node is a ground voltage, and the voltage of the first node is a sum of the difference value between the high voltage level and the low voltage level of the data signal, and the threshold voltage and the ground voltage.

During the light-emitting stage ST4, the light-emitting controlling signal EM is at the high voltage level, and only the third thin film transistor T3 and the fourth thin film transistor T4 are turned on. All of the first scan signal SCAN1, the second scan signal SCAN2, the third scan signal SCAN3, the fourth scan signal SCAN4, and the data signal DATA are at the low voltage level. That is, all of the second thin film transistor T2, the fifth thin film transistor T5, the sixth thin film transistor T6, and the seventh thin film transistor T7 are turned off. The voltage level of the second node S is the ground voltage VSS. The voltage level of the first node G is a sum DATA_H-DATA_L+Vth+VSS of the difference value between the high voltage level DATA_H and the low voltage level DATA_L of the data signal, and the threshold voltage Vth and the ground voltage VSS. It should be understood that, during the light-emitting stage ST4, only the light-emitting controlling signal EM at the high voltage level turns on the third thin film transistor T3 and the fourth thin film transistor T4. All other thin film transistors are turned off. The voltage level of the second node S changes from the reference signal Ref to the ground voltage VSS. The voltage level of the first node G changes from DATA_H-DATA_L+Ref+Vth to DATA_H-DATA_L+Vth+VSS. Since Vgs−Vth=DATA_H-DATA_L, wherein Vgs represents the voltage difference between the gate and the source of the first thin film transistor T1, thus, during the light-emitting stage ST4, the voltage level of the first node G is Vgs+VSS. That is to say, during the light-emitting stage ST4, the current flowing through the light-emitting device D is independent from the threshold voltage Vth of the first thin film transistor T1, which realizes compensation for the threshold voltage Vth and further eliminates the influence of the threshold voltage offset of the first thin film transistor T1 on the current flowing through the light-emitting device D. In addition, the voltage level flowing through the first node G and the second node S changes to Vgs. That is to say, the current flowing through the first node G and the second node S is independent from the ground voltage VSS, which realizes compensation for the voltage drop and further eliminates the influence of the voltage drop of the communication signal lines on the display panel 1, thereby improving the display uniformity of the display panel 1.

The pixel driving circuit 10, the pixel driving method, and the display panel 1 provided by the embodiments of the present application adopt the 7T2C pixel driving circuit 10, which controls the scan signal, the light-emitting signal, and the data signal respectively in the initialization stage, the threshold voltage extraction stage, the data writing stage, and the light-emitting stage to be at different voltage levels, so as to compensate for the threshold voltage of the driving thin film transistor in each pixel and further eliminate the influence of the threshold voltage of the driving thin film transistor on the current flowing through the light-emitting device D, thereby improving the display uniformity of the display panel 1. In addition, during the light-emitting stage, the influence of the voltage drop of the part of the communication signal lines on the display panel 1 can further be eliminated.

In the above embodiments, the description of each embodiment is provided with its emphasis. A part that is not described in detail in a certain embodiment may refer to the description of other embodiments.

In the description of the present application, the terms "first" and "second" are only used for description purposes, and cannot be understood as indicating or implying relative importance or implying the number of indicated technical features. Thus, features defined as "first" and "second" may expressly or implicitly include one or more features.

The pixel driving circuit, the pixel driving method, and the display panel provided by the embodiments of the present application have been introduced in detail. Specific examples are applied herein to explain the principles and embodiments of the present application, but the description of the above embodiments is only used to help to understand the methods and the core idea of the present application. At the same time, for those ordinary skilled in the art, there will be changes in the specific embodiments and application scopes based on the ideas of the present application. In conclusion, the content of this description should not be construed as limiting the present application.

What is claimed is:

1. A pixel driving circuit, comprising:

a first thin film transistor, a second thin film transistor, a third thin film transistor, a fourth thin film transistor, a fifth thin film transistor, a sixth thin film transistor, a seventh thin film transistor, a first capacitor, a second capacitor, and a light-emitting device, the first thin film transistor configured as a driving thin film transistor of the light-emitting device;

wherein a gate of the first thin film transistor is electrically connected to a first node, and a drain of the first thin film transistor is electrically connected to a second node;

a gate of the second thin film transistor receives a first scan signal, a source of the second thin film transistor receives a data signal, and a drain of the second thin film transistor is electrically connected to the first node;

a gate of the third thin film transistor receives a light-emitting controlling signal, and a drain of the third thin film transistor is electrically connected to a source of the first thin film transistor;

a gate of the fourth thin film transistor receives the light-emitting controlling signal, a source of the fourth thin film transistor is electrically connected to the second node, and a drain of the fourth thin film transistor receives a ground voltage;

a gate of the fifth thin film transistor receives a second scan signal, a source of the fifth thin film transistor is connected to the first node, and a drain of the fifth thin film transistor is electrically connected to the drain of the third thin film transistor;

a gate of the sixth thin film transistor receives a third scan signal, a source of the sixth thin film transistor receives a power voltage, and a drain of the sixth thin film transistor is electrically connected to the first node;

a gate of the seventh thin film transistor receives a fourth scan signal, a source of the seventh thin film transistor receives a reference signal, and a drain of the seventh thin film transistor is electrically connected to the second node;

one end of the first capacitor is electrically connected to the first node, and another end of the first capacitor is electrically connected to the second node;

one end of the second capacitor is electrically connected to the first node, and another end of the second capacitor is electrically connected to the drain of the second thin film transistor; and an anode of the light-emitting device receives the power voltage, and a cathode of the light-emitting device is electrically connected to a source of the third thin film transistor, voltage levels of the first scan signal, the second scan signal, the third scan signal, the fourth scan signal, the light-emitting controlling signal, and the data signal are configured to form different voltage level combinations to correspond to an initialization stage, a threshold voltage extraction stage, a data writing stage, and a light-emitting stage in sequence.

2. The pixel driving circuit according to claim 1, wherein during the initialization stage, all of the first scan signal, the third scan signal, and the fourth scan signal are at a high voltage level, and all of the second scan signal, the light-emitting controlling signal, and the data signal are at a low voltage level; a voltage level of the first node is the power voltage, and a voltage level of the second node is the reference signal.

3. The pixel driving circuit according to claim 1, wherein during the threshold voltage extraction stage, all of the first scan signal, the second scan signal, and the fourth scan signal are at a high voltage level, and all of the third scan signal, the light-emitting controlling signal, and the data signal are at a low voltage level; a voltage level of the first node is a sum of the reference signal and a threshold voltage, and a voltage level of the second node is the reference signal.

4. The pixel driving circuit according to claim 1, wherein during the data writing stage, all of the first scan signal, the fourth scan signal, and the data signal are at a high voltage level, and all of the second scan signal, the third scan signal, and the light-emitting controlling signal are at a low voltage level; a voltage level of the first node is a sum of a difference value between the high voltage level and a low voltage level of the data signal, and the reference signal and a threshold voltage, and a voltage level of the second node is the reference signal.

5. The pixel driving circuit according to claim 1, wherein during the light-emitting stage, the light-emitting controlling signal is at a high voltage level, and all of the first scan signal, the second scan signal, the third scan signal, the fourth scan signal, and the data signal are at a low voltage level; a voltage level of the second node is the ground voltage, and a voltage level of the first node is a sum of a difference value between a high voltage level and the low voltage level of the data signal, and a threshold voltage and the ground voltage.

6. The pixel driving circuit according to claim 5, wherein during the light-emitting stage, a current flowing through the first node and the second node is independent from the ground voltage.

7. The pixel driving circuit according to claim 6, wherein during the light-emitting stage, a current flowing through the light-emitting device is independent from a threshold voltage of the first thin film transistor.

8. The pixel driving circuit according to claim 1, wherein all of the first thin film transistor, the second thin film transistor, the third thin film transistor, the fourth thin film transistor, the fifth thin film transistor, the sixth thin film transistor, and the seventh thin film transistor are oxide semiconductor thin film transistors, low-temperature polysilicon thin film transistors, or amorphous silicon thin film transistors.

9. The pixel driving circuit according to claim 8, wherein the light-emitting device is an organic light-emitting diode.

10. The pixel driving circuit according to claim 1, wherein all of the first scan signal, the second scan signal, the third scan signal, the fourth scan signal, the light-emitting controlling signal, and the data signal are generated by an external timing controller.

11. A pixel driving method applied to a pixel driving circuit comprising seven thin film transistors, two capacitors, and a light-emitting device, wherein a first one of the seven thin film transistors has a gate electrically connected to a first node, and a drain electrically connected to a second node;

a second one of the seven thin film transistors has a drain electrically connected to the first node;

a third one of the seven thin film transistors has a drain electrically connected to a source of the first thin film transistor;

a fourth one of the seven thin film transistors has a source electrically connected to the second node;

a fifth one of the seven thin film transistors has a source connected to the first node, and a drain electrically connected to the drain of the third thin film transistor;

a sixth one of the seven thin film transistors has electrically connected to the first node;

a seventh one of the seven thin film transistors has a drain electrically connected to the second node;

a first one of the two capacitors has one end connected to the first node, and another end connected to the second node;

a second one of the two capacitors has one end connected to the first node, and another end connected to the drain of the second thin film transistor; and the light-emitting device has a cathode connected to a source of the third thin film transistor; and the light-emitting device is driven by the first thin film transistor; and wherein the pixel driving method comprises:

during an initialization stage, controlling all of a first scan signal received at a gate of the second thin film transistor, a third scan signal received at a gate of the six thin film transistor, and a fourth scan signal received at a gate of the seven thin film transistor to be at a high voltage level, and controlling all of a second scan signal received at a gate of the fifth thin film transistor, a light-emitting controlling signal received at a gate of the third thin film transistor and a gate of the fourth thin film transistor, and a data signal received at a source of the second thin film transistor to be at a low voltage level, so that a voltage level of the first node is a power voltage received at a source of the sixth thin film transistor and an anode of the light-emitting device, and a voltage level of the second node is a reference signal received at a source of the seventh thin film transistor;

during a threshold voltage extraction stage, controlling all of the first scan signal, the second scan signal, and the fourth scan signal to be at the high voltage level, and controlling all of the third scan signal, the light-emitting controlling signal, and the data signal to be at the low voltage level, so that the voltage level of the first node is a sum of the reference signal and a threshold voltage, and the voltage level of the second node is the reference signal;

during a data writing stage, controlling all of the first scan signal, the fourth scan signal, and the data signal to be at the high voltage level, and controlling all of the second scan signal, the third scan signal, and the light-emitting controlling signal to be at the low voltage level, so that the voltage level of the first node is a sum of a difference value between the high voltage level and the low voltage level of the data signal, and the reference signal and the threshold voltage, and the voltage level of the second node is the reference signal; and during a light-emitting stage, controlling the light-emitting controlling signal to be at the high voltage level, and controlling all of the first scan signal, the second scan signal, the third scan signal, the fourth scan signal, and the data signal to be at the low voltage level, so that the voltage level of the second node is a ground voltage received at a drain of the fourth thin transistor, and the voltage level of the first node is a sum of the difference value between the high voltage level and the low voltage level of the data signal, and the threshold voltage and the ground voltage.

12. The pixel driving method according to claim 11, wherein during the light-emitting stage, a current flowing through the first node and the second node is independent from the ground voltage.

13. The pixel driving method according to claim 12, wherein during the light-emitting stage, a current flowing through the light-emitting device is independent from a threshold voltage of the first thin film transistor.

14. A display panel, comprising a pixel driving circuit, the pixel driving circuit comprising a first thin film transistor, a second thin film transistor, a third thin film transistor, a fourth thin film transistor, a fifth thin film transistor, a sixth thin film transistor, a seventh thin film transistor, a first capacitor, a second capacitor, and a light-emitting device, the first thin film transistor configured as a driving thin film transistor of the light-emitting device;

wherein a gate of the first thin film transistor is electrically connected to a first node, and a drain of the first thin film transistor is electrically connected to a second node;

a gate of the second thin film transistor receives a first scan signal, a source of the second thin film transistor receives a data signal, a drain of the second thin film transistor is electrically connected to the first node;

a gate of the third thin film transistor receives a light-emitting controlling signal, and a drain of the third thin film transistor is electrically connected to a source of the first thin film transistor;

a gate of the fourth thin film transistor receives the light-emitting controlling signal, a source of the fourth thin film transistor is electrically connected to the second node, and a drain of the fourth thin film transistor receives a ground voltage;

a gate of the fifth thin film transistor receives a second scan signal, a source of the fifth thin film transistor is connected to the first node, and a drain of the fifth thin film transistor is electrically connected to the drain of the third thin film transistor;

a gate of the sixth thin film transistor receives a third scan signal, a source of the sixth thin film transistor receives a power voltage, and a drain of the sixth thin film transistor is electrically connected to the first node;

a gate of the seventh thin film transistor receives a fourth scan signal, a source of the seventh thin film transistor receives a reference signal, and a drain of the seventh thin film transistor is electrically connected to the second node;

one end of the first capacitor is electrically connected to the first node, and another end of the first capacitor is electrically connected to the second node;

one end of the second capacitor is electrically connected to the first node, and another end of the second capacitor is electrically connected to the drain of the second thin film transistor; and an anode of the light-emitting device receives the power voltage, and a cathode of the light-emitting device is electrically connected to a source of the third thin film transistor, voltage levels of the first scan signal, the second scan signal, the third scan signal, the fourth scan signal, the light-emitting controlling signal, and the data signal are configured to form different voltage level combinations to correspond to an initialization stage, a threshold voltage extraction stage, a data writing stage, and a light-emitting stage in sequence.

15. The display panel according to claim 14, wherein during the initialization stage, all of the first scan signal, the third scan signal, and the fourth scan signal are at a high voltage level, and all of the second scan signal, the light-emitting controlling signal, and the data signal are at a low voltage level; a voltage level of the first node is the power voltage, and a voltage level of the second node is the reference signal.

16. The display panel according to claim 14, wherein during the threshold voltage extraction stage, all of the first scan signal, the second scan signal, and the fourth scan signal are at a high voltage level, and all of the third scan signal, the light-emitting controlling signal, and the data signal are at a low voltage level; a voltage level of the first node is a sum of the reference signal and a threshold voltage, and a voltage level of the second node is the reference signal.

17. The display panel according to claim 14, wherein during the data writing stage, all of the first scan signal, the fourth scan signal, and the data signal are at a high voltage level, and all of the second scan signal, the third scan signal, and the light-emitting controlling signal are at a low voltage level; a voltage level of the first node is a sum of a difference value between the high voltage level and a low voltage level of the data signal, and the reference signal and a threshold voltage, and a voltage level of the second node is the reference signal.

18. The display panel according to claim 14, wherein during the light-emitting stage, the light-emitting controlling signal is at a high voltage level, and all of the first scan signal, the second scan signal, the third scan signal, the fourth scan signal, and the data signal are at a low voltage level; a voltage level of the second node is the ground voltage and a voltage level of the first node is a sum of a difference value between a high voltage level and the low voltage level of the data signal, and a threshold voltage and the ground voltage.

* * * * *